March 28, 1950 M. WALLACE 2,502,294

DOUBLE SWEEP PANORAMIC RADIO RECEIVER

Filed Aug. 19, 1943 3 Sheets-Sheet 1

INVENTOR
MARCEL WALLACE
BY Darby & Darby
ATTORNEY

INVENTOR
MARCEL WALLACE
BY Darby & Darby
ATTORNEY

March 28, 1950 M. WALLACE 2,502,294

DOUBLE SWEEP PANORAMIC RADIO RECEIVER

Filed Aug. 19, 1943 3 Sheets-Sheet 3

INVENTOR
MARCEL WALLACE
BY Darby & Darby
ATTORNEY

Patented Mar. 28, 1950 2,502,294

UNITED STATES PATENT OFFICE 2,502,294

DOUBLE SWEEP PANORAMIC RADIO RECEIVER

Marcel Wallace, New York, N. Y., assignor, by mesne assignments, of one-half to Marcel Wallace, doing business as Panoramic Laboratories, New York, N. Y., and one-half to Panoramic Radio Corporation, New York, N. Y., a corporation of New York Application August 19, 1943, Serial No. 499,199

20 Claims. (Cl. 250—20)

My invention relates to radio, particularly to panoramic radio receivers of the type adapted to scan and visually show a panorama of the radio signals within a relatively wide portion of the radio frequency spectrum.

The conventional panoramic receiver, comprising a superheterodyne type of receiver with a local oscillator periodically varied in frequency and synchronized with a sweep voltage of a cathode ray oscillograph, is effective for scanning and simultaneously visually showing all of the signals in a portion of the radio spectrum, but is limited as to the range of frequencies that may be simultaneously received and shown. Unfortunately, several factors including resolution of the receiving circuits, determine the maximum scanning speed. Since the maximum rate of scanning is limited, the width of the scanned band is limited, for a given scanning time.

The object of my invention is to extend the width of the radio frequency band which may be scanned and visually reproduced by the panoramic type of receiver.

One specific object of my invention is to visually reproduce at one time two distinct bands of signals on one cathode ray screen.

Another specific object of my invention is to scan and visually reproduce signals in a limited band, and to move the band over a relatively wide range of the radio spectrum.

Other objects will appear as the description of my invention proceeds.

Figure 1:
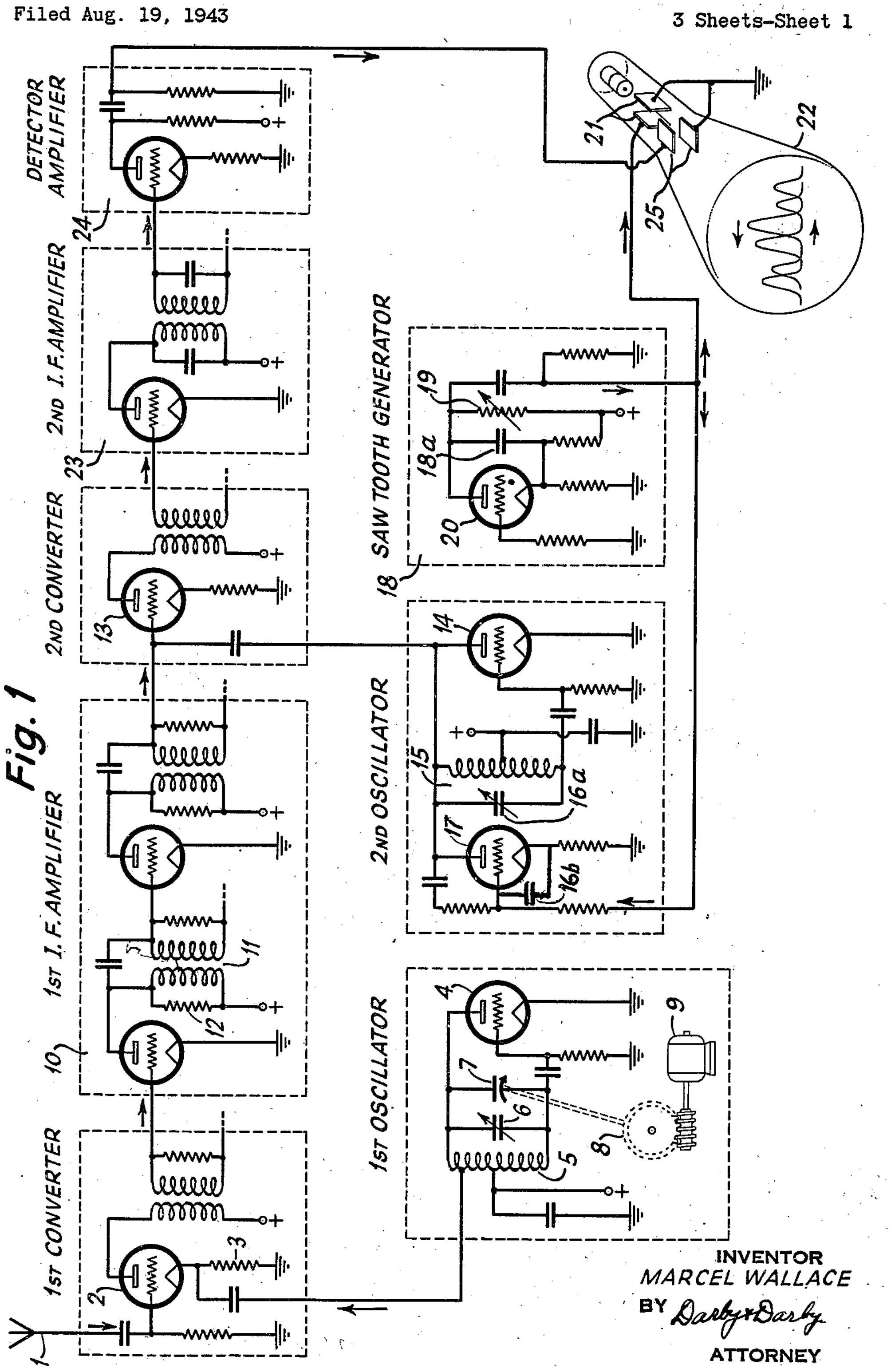
Figure 2:
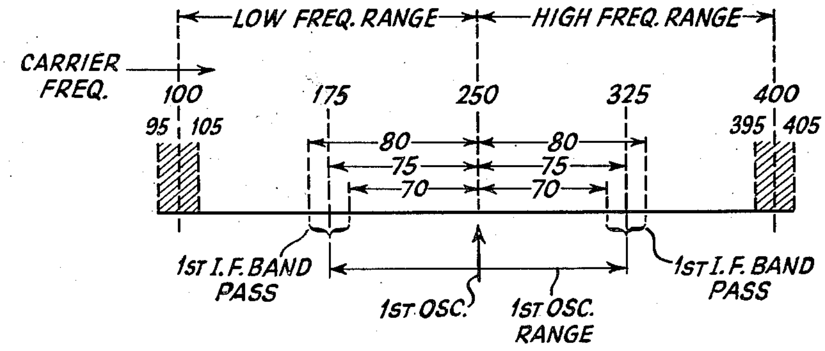
Figures 3, 4, 5:
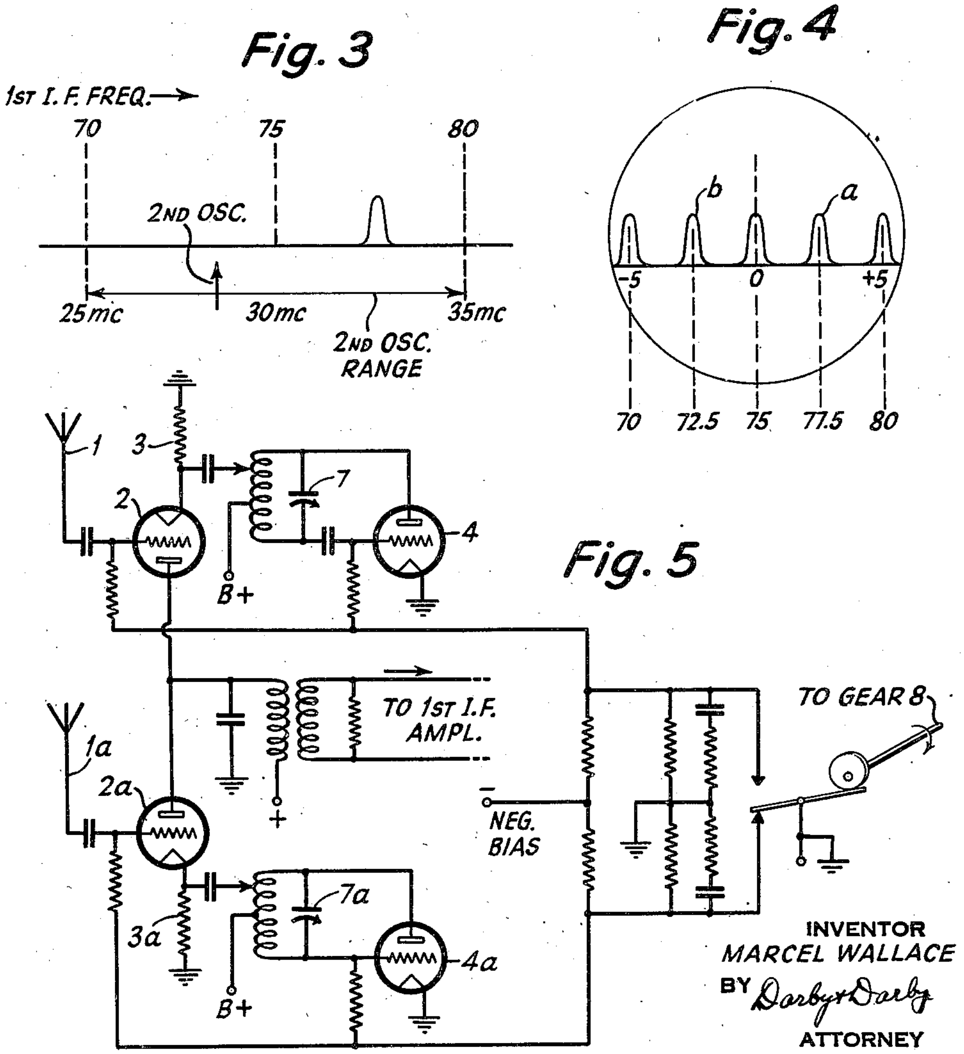
Figure 6:
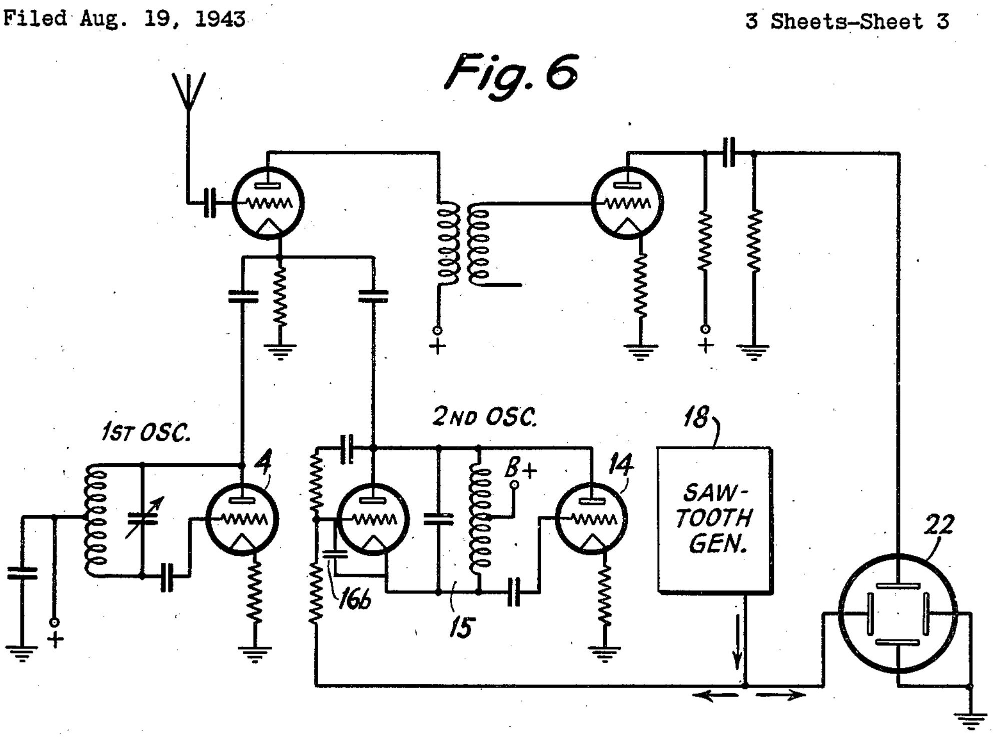
Figure 7:
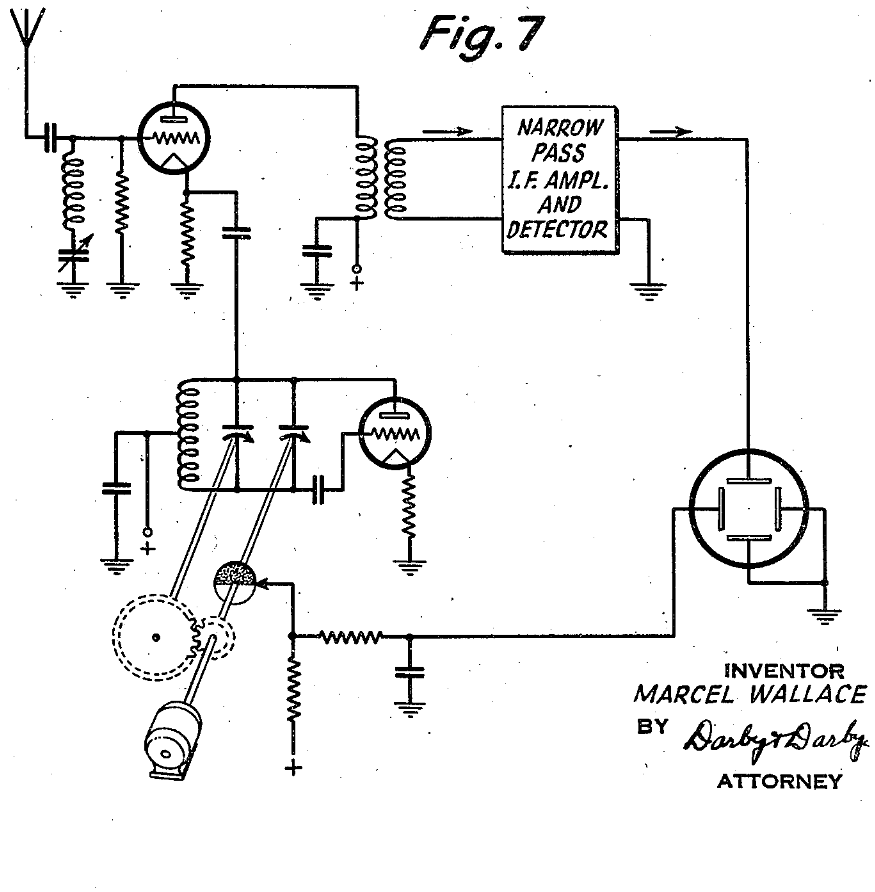

My invention is defined with particularity in the appended claims, and one embodiment thereof is described in the following specification and shown in the accompanying drawing in which Figure 1 is a schematic diagram of one simplified circuit of my improved receiver, Figure 2 shows an example of the relation of carrier frequencies with the frequency of the first oscillator of my improved receiver, Figure 3 shows the corresponding first intermediate frequencies and the frequencies of the second oscillator of my improved receiver, Figure 4 shows a signal as it is visually reproduced on the screen of the cathode ray tube, Figure 5 shows switching circuit of my receiver for alternately rendering operative two frequency converters adapted respectively to receive adjacent portions of the radio spectrum, Figure 6 shows the two oscillators of my receiver coupled to a common converter, and Figure 7 shows a single oscillator embodying the sweep characteristics of the two oscillators of Figure 1.

One specific receiver, embodying my invention comprises a high frequency signal receiving circuit or antenna coupled directly to a first frequency converter, the input of which is also coupled with a first oscillator. The frequency of the first oscillator may be progressively varied over a relatively wide range, the variation being effected, for example, by rotating the rotor of a conventional tuning condenser. This first oscillator constitutes a primary tuning means, which may be progressively varied in frequency at a relatively slow rate, manually or by a motor connected to the tuning condenser shaft through speed reducing gears. The first intermediate frequency signals are impressed upon a second frequency converter, the input circuit of which is coupled to a second oscillator. The second oscillator is modulated in frequency either mechanically, or preferably by a voltage wave of sawtooth shape, so that the second converter progressively and repetitively passes to its output circuit a second intermediate frequency that rapidly varies between limits predetermined by the frequency range of the second oscillator. This constitutes the secondary tuning means of my receiver. The output of the second converter is fed through a narrow bandpass filter, is amplified if desired, is rectified, and is impressed on the vertical deflection plates of a cathode ray tube, the horizontal deflection plates of which are connected to the sawtooth wave generator. In one mode of operation, it is preferred that the rate of change of the second oscillator be considerably higher than the rate of change of the first oscillator. The signals changed in frequency by the first oscillator may, if desired, be amplified in a first intermediate frequency amplifier connected between the two converters, the stages of the amplifier being coupled by broad band pass transformers or filters.

In Figure 1 the essential elements of one embodiment of my novel receiver are simplified and shown in a block diagram. The signal receiving circuit 1 is shown as an antenna and is coupled aperiodically with the grid of a first converter tube 2, the cathode resistor 3 in the input circuit of the tube being coupled across the output of the first oscillator 4. The tank circuit of the first oscillator preferably comprises the condenser 6 and coil 5 in parallel with a motor-driven rotating condenser 7. The rotating condenser may be mounted on a shaft for manual tuning, and, as preferred, the shaft may also be connected through reduction gears 8 to a motor 9. The output of the first converter is fed directly to the input of the first intermediate frequency amplifier 10 having coupling transformers 11 with band spreading resistors 12. As more fully described hereinafter, the width of the band passed by the I. F. amplifier 10 is made at least as wide as the width of the band of frequencies that may be scanned by the second oscillator and accepted by the second converter and its I. F. circuits. To the input of the second converter 13 is fed the first intermediate frequency as well as the periodically varied output of the second oscillator 14. As more fully described in my Patent No. 2,312,203, issued February 23, 1943, the second oscillator may comprise a tank circuit 15 with the usual tuning condenser 16a connected across a tuning coil. The reactance of vacuum tube 17 with its grid voltage phase shifting condenser 16b in the circuit shown is effective in determining the frequency of oscillation over a wide band, and since the tube reactance is a function of grid voltage, the oscillator is conveniently frequency modulated by variations of the grid voltage. I impress a voltage wave of sawtooth shape on the grid so that the oscillations will vary in frequency periodically over a predetermined range in synchronism with the sawtooth wave.

The generator 18 of the sawtooth wave preferably comprises a condenser 18a slowly charged through a resistor 19 and periodically discharged through the gas filled tube 20 as described in my patent, supra. The output of the sawtooth wave generator is coupled directly to the reactor tube grid and to one pair of deflection plates 21, preferably the "horizontal" plates, of the cathode ray tube 22 so that the horizontal deflection of the cathode beam is in synchronism and progresses with the frequency changes of the second oscillator. Any signal appearing at the input of the second converter hence will produce a standing deflection loop on the screen, when the sweep cycle is shorter than the screen persistence. The output of the second converter is coupled to a second intermediate frequency amplifier 23, preferably sharply tuned to a relatively narrow band. The amplified I. F. is rectified by detector 24 and impressed on the vertical deflecting plate 25. The speed of the scanning is preferably high enough so that the persistence of vision and of the screen will produce a continuous trace on the screen. The second converter is followed by a conventional sharply tuned intermediate frequency amplifier 23, rectifier 24. The video signal output of the rectifier may, if desired, be amplified before its application to the "vertical" deflection plates 25 of the cathode ray tube 22.

To better explain the operation of my novel receiver, a specific example of frequencies is given. Such an example is, of course, not to be construed as limiting my invention. The portion of the radio spectrum which may be received by my novel receiver is laid out on a linear scale in Fig. 2, and the scale of the first intermediate frequency is enlarged and shown with the frequencies of the second oscillator, in Figure 3. The resulting images on the cathode ray tube screen are shown in Figure 4. If, for example, the carriers that are to be received are situated between 100 megacycles and 250 megacycles, or in the band of 250 megacycles to 400 megacycles, and if the band characteristics of the first intermediate frequency amplifier and filter are such that, as shown in Figure 3, only frequencies between 70 and 80 megacycles (center frequency at 75 megacycles) are passed, then the first oscillator should be variable from 175 megacycles to 325 megacycles to reproduce any received signal in the center of the first intermediate frequency band (75 megacycles). Although the output of the first oscillator will combine with any frequency received by the aperiodic antenna, only those combinations of frequencies which produce intermediate frequencies between 70 and 80, and which will pass the first I. F. amplifier need be considered.

With a signal input to the second converter between 70 and 80 megacycles, it has been found convenient to provide the second intermediate frequency amplifier with a narrower bandpass characteristic centered, for example, at 45 megacycles. The second oscillator, in this case, will have to be centered at 30 megacycles and periodically variable from 25 to 35 megacycles.

By reference to Figure 3 it is seen that any first I. F. signal received between 70 and 80 megacycles will produce an image on the screen in a position corresponding to the frequency position of the signal between the limits of the 1st I. F. band pass.

Signals producing an intermediate frequency of 75 megacycles will appear on the screen when the second oscillator will pass through its center frequency of 30 megacycles and, therefore, will be visible in the center of the screen shown on Figure 4 as O.

Signals producing an intermediate frequency of 70 megacycles will appear at one extremity of the screen (—5) while signals producing an intermediate frequency of 80 megacycles will appear at the other extremity (+5 on Figure 4).

Good results have been obtained in adjusting the second oscillator to sweep the 25–35 megacycle band 30 times per second. This sweep rate has the advantage that synchronism of the various circuits is made easy when the power supply is commercial 60 cycle A. C. This sweep frequency also permits I. F. coupling transformers having low decrement, and Q values as high as 100 without sacrificing circuit and visual resolution.

Assume, now, that a carrier of 252.5 megacycles is received at the antenna and that the first oscillator is operating at its lowermost frequency of 175 megacycles. The resulting first I. F. of 77.5 megacycles is passed by the 1st I. F. amplifier and is impressed upon the second converter. In the second converter the 77.5 megacycle signal is periodically combined with a 32.5 megacycle wave from the second oscillator each time (30 times per second) the second oscillator frequency tunes through 32.5 megacycles. Since the horizontal sweep voltage of the cathode ray tube is synchronized with the second oscillator, vertical deflections reoccur 30 times each second at the same point on the screen and cause an apparently stationary trace on the screen at *a*, Figure 4.

If now, the first oscillator frequency slowly increases 5 megacycles (from 175 to 180 megacycles), the first intermediate frequency of the 247.5 megacycle signal decreases from 77.5 to 72.5 megacycles, and the image of the signal on the screen, Figure 4, travels slowly along the base line from its position, at *a* to a position at *b*.

It is a well known property of conventional vacuum tube frequency converters or mixers that signal carriers both above and below the frequency of the local oscillator will combine in the converter with the local oscillations to produce frequencies which will pass the tuned I. F. amplifier and will reproduce in the loudspeaker the signals of both carriers. The receiver of my invention turns to good advantage this property of the converter heretofore considered undesirable.

Instead of tuning the R. F. to eliminate all signals above (or below) the oscillator, my antennae and any connected R. F. amplifiers are deliberately made aperiodic, or broadly tuned, to pass carriers above and below the local oscillator. No signal received is rejected, but all are reproduced, visually, on the cathode ray tube screen.

It will now become apparent that by being able to identify signals above and below the oscillator frequency, for a given frequency range of the 1st oscillator, the width of the band covered, or the number of stations that can be visually reproduced on the screen, may be doubled without confusing the stations. As the oscillator is varied in frequency, two sets of visual signs will appear on the base line of the screen: one set moving in a direction opposite to the other. Indeed, if the frequency of the local oscillator 4 is $F_0$ and the frequencies of two carriers, one lower and the other higher than $F_0$, are respectively $F_1$ and $F_2$, then two resulting intermediate frequencies $F'_1$ and $F'_2$ will be:

$$F'_1 = F_0 - F_1$$

and $$F'_2 = F_2 - F_0$$

If now, the frequency $F_0$ of the local oscillator is changed, say increased by *m* kilocycles, then the value of $F'_1$ increases while $F'_2$ decreases by *m* kilocycles. The direction of frequency change of the resultant signal in the first I. F. amplifier 10 will determine the direction of travel of the visual sign across the screen. When the two resultant signals are equal, and the images on the screen actually superimpose one on the other, they are easily separated and identified by changing the first oscillator frequency in a given direction, and noting the direction of travel of the visual sign on the screen.

With the frequency constants above mentioned, two carriers $F_1$ and $F_2$ will each produce a signal image on the screen at the same time when the carriers are within 70 to 80 megacycles frequency spacing from the 1st oscillator, and that these two images will pass each other someplace along the base line on the screen as the oscillator is tuned. If the two carriers are exactly 150 megacycles apart (75 above and below the oscillator), their visual images will occur at the center of the screen.

In the specific example of frequencies suggested above and shown in Figure 2, the low frequency range of 100 megacycles to 250 megacycles ends where the high frequency range (of 250 megacycles to 400 megacycles) begins. In order to obtain this result, it is necessary that the first I. F. frequency be centered at a point in the frequency spectrum equal to one quarter of the total band to be covered (or one half of the oscillator range). This is easily seen, since the R. F. circuit has broad bandpass characteristics, or is aperiodic to all of the signals within the range to be received, the oscillator frequency will combine with all frequencies above the oscillator frequency as well as below the oscillator frequency, the distance the oscillator will "reach" above or below its range being determined by the frequency response of the first intermediate amplifier.

While it is preferred that the oscillator be tunable over the center two quarters of the spectrum, it is contemplated that this oscillator tuning range may be less, so that a portion of the radio spectrum straddled by the oscillator may not be received. Alternatively, the oscillator may be tuned over a range greater than the center two quarters of the spectrum, so that the center portion of the spectrum may be received and reproduced both by the sum and the difference combinations with the oscillator, i. e., the coverage of the spectrum by the oscillator may overlap or leave a gap, as desired.

To further extend the range of my improved receiver, it has been found convenient to provide an additional first converter with an additional first oscillator as shown in Figure 5. The oscillators may be alternately switched, mechanically or electrically, to their respective converters, preferably by a cam-driven switch in the grid circuits geared to the motor 9. After the lower frequency oscillator 4 and converter 2 tunes from 100 megacycles to 400 megacycles the high frequency oscillator 4a and converter 2a are switched in and the band from 400 to 700 megacycles is scanned without interruption.

The disadvantages of low gain of the broad band-pass amplifiers of the 1st intermediate frequency amplifier 10 may, if desired, be eliminated and the two frequency converters illustrated in Figure 1, combined in a single tube or stage. As suggested in Figure 6, for example, the output of the two oscillators may each be fed directly into the input circuit of the converter. If one of the oscillators is slowly tuned as by a motor, and the second is rapidly tuned by a reactance tube and a sawtooth generator, a narrow band-pass I. F. amplifier and filter will impress upon the vertical deflection plates a visual signal image of each of the radio signals received at the aperiodic antenna.

Alternatively, the two oscillators may be combined in one circuit, as suggested in Figure 7, where the tank circuit contains two tuning elements, one driven slowly and the other faster, to obtain the series of signal images moving across the face of the cathode ray tube screen. The higher speed variation could, if desired, be obtained by a reactor tube and sawtooth wave generator.

The receiver, acording to my invention, extends the width of the radio band which may be scanned and visually reproduced.

I claim:

1. A wave signal receiving circuit, a primary tuning means for said receiving circuit covering a wide band of the frequency spectrum, and a secondary tuning means for said receiving circuit covering a narrower band within the said wide band, means for periodically and repetitively operating both of said tuning means simultaneously, the rate of tuning of said primary tuning means being slower than the rate of tuning said secondary tuning means, amplifying means connected to said receiving circuit, a cathode ray oscilloscope having two pairs of deflection elements, means for impressing the output of said amplifying means on one pair of elements, means for generating and impressing a sweep voltage on the other pair of elements, and means synchronizing the sweep voltage means with said secondary tuning means.

2. A wave signal receiving circuit, a first and a second oscillator, automatic means for tuning each oscillator progressively and periodically over predetermined bands of frequencies, the rates of tuning the two oscillators being different, means to heterodyne the signals of the signal receiving circuit with the output voltages of the two oscillators, a cathode ray oscilloscope having two pairs of deflection elements, means for impressing the heterodyned oscillator and high frequency signal voltages on one pair of elements, means for impressing a sweep voltage on the other pair of deflection elements, and means synchronizing the sweep voltage with the frequency changes of one of the oscillators.

3. A panoramic wave signal receiving circuit comprising a first frequency converter with an input coupled to the receiving circuit, a first oscillator coupled to said first converter input, means for progressively and repetitively changing the frequency of said first oscillator at a predetermined rate, a broad band pass amplifier coupled to the output of said first converter, a second frequency converter with an input circuit coupled to the output of said amplifier, a second oscillator coupled to the input of the second converter, means for progressively and repetitively changing the frequency of said second oscillator, the rate of change of frequency of the second oscillator being higher than said predetermined rate of change of frequency of the first oscillator, a narrow band pass filter coupled to the output of the second converter, and signal indicating means coupled to the output of the filter.

4. In combination a wave receiving circuit, means coupled to said circuit for selecting all signals within a frequency band of determined width, adjustable tuning means for continuously and repetitively shifting the frequency position of said band at one rate, means for scanning said band at a faster rate and simultaneously visually reproducing all signals in said band.

5. In a wave signal receiving system, a signal receiving circuit with means for selecting a broad band of frequencies and for continuously and repetitively shifting the frequency position of said band at one rate, an oscilloscope having two sets of deflecting elements, a source of sweep voltage connected to one of said sets of deflecting elements, means for connecting the other set of deflecting elements to said signal receiving circuit, means interconnected between said signal receiving circuit and said source of sweep voltage and controlled by said source for periodically tuning said signal receiving circuit over a narrow band of frequencies within said broad band at a faster rate and in synchronism with said sweep voltage.

6. In the wave signaling art, in combination, a first frequency selecting circuit receptive of a relatively wide range of frequencies, means for shifting said range at one rate, a second frequency selecting circuit connected to the output of said first circuit, said second circuit being selective of a relatively narrow band within said range, means for periodically varying the frequency of said second selecting circuit at a faster rate, and an oscilloscope for visually showing images of signals within the band, connected to the output of the said second circuit.

7. In a wave signal receiving system a tunable signal receiving circuit with means for continuously and repetitively tuning said signal circuit over a relatively wide range of frequencies at one rate, a cathode ray oscilloscope including a cathode ray generator and a screen, deflecting means for controlling the movement of the cathode ray in different directions over said screen, a source of sweep voltage connected with said deflecting means for deflecting said cathode ray in one direction, a tuned circuit coupled to the tunable signal receiving circuit, means connected with said tuning circuit and controlled by said source of sweep voltage for varying the resonant frequency of said tuned circuit over a frequency band within said range at a faster rate, and a connection from said tuned circuit to the deflecting means for deflecting said cathode ray in a different direction, whereby all signals received through said signal receiving circuit throughout said frequency band are substantially simultaneously pictured on said screen in spatial relation.

8. A wave signal receiving circuit, a converter tube coupled aperiodically to said circuit, an oscillator coupled to said converter tube, the frequency of said oscillator being adjustable over a predetermined frequency range means for continuously and repetitively adjusting the oscillator to vary its frequency to the converter to vary the converter output frequencies, an intermediate frequency amplifier coupled to the output of said converter, said amplifier being adapted to pass intermediate frequency signals within a predetermined range produced by wave signals both above and below the oscillator frequency range, and means for scanning and visually reproducing the signals passed by said amplifier.

9. In combination, a radio frequency receiving circuit, a converter, an oscillator circuit, the receiving and oscillator circuits being coupled to the input of said converter, means continuously and repetitively varying the frequency of said oscillator circuit, a band pass filter connected to the output of said converter, and means for scanning the frequency band passed by the filter and visual indicating means for simultaneously showing as individual signs all signals passed by said filter, said radio frequency circuit being sufficiently broadly tuned to pass radio frequency carriers above as well as below the frequency of said oscillator circuit so that as the oscillator is changed is frequency in a given direction, all intermediate frequency signals resulting from carriers above the oscillator frequency will increase in frequency, while all intermediate frequency signals resulting from carriers below the oscillator frequency will decrease in frequency, and wherein the direction of movement of the said visual signs will characterize the said carriers.

10. The method of receiving wave signals to observe a frequency band, comprising the steps of: scanning said frequency band to determine the simultaneous presence of displaced pairs of signals in said band, converting said pairs of signals simultaneously to positions within a common frequency spectrum, frequency scanning the said spectrum, and indicating the locations of said signals within said spectrum.

11. In combination, a radio frequency receiving circuit adapted to pass signals within a predetermined frequency band, a frequency converter having an input and an output circuit, means coupling said input circuit to said radio frequency receiving circuit, an intermediate frequency band pass circuit coupled to said output circuit, a local oscillator coupled to said input circuit, means for varying the frequency of said local oscillator over a predetermined range of frequencies intermediate the limits of said predetermined frequency band for converting input frequencies present in said predetermined frequency band which are equal in value to the sum and the difference of said frequency of said local oscillator and any frequency passed by said intermediate frequency band pass circuit, and means for periodically frequency scanning the pass band of said intermediate band pass circuit and indicating the presence of signals therein.

12. In combination, a wave signal receiving circuit, means coupled to said circuit for selecting all signals within a frequency band of predetermined width, adjustable tuning means for continuously and repetitively shifting the frequency position of said band at one rate, means for scanning said band at a faster rate and simultaneously visually reproducing all signals in said band, said adjustable tuning means comprising an oscillator having an adjustable condenser for continuously and repetitively shifting the frequency of said oscillator at said one rate, said means for scanning comprising a further condenser for shifting the frequency of said oscillator at said faster rate.

13. In combination, a wave signal receiving circuit, means coupled to said circuit for selecting all signals within a frequency band of predetermined width, adjustable tuning means for continuously and repetitively shifting the frequency position of said band at one rate, means for scanning said band at a faster rate and simultaneously visually reproducing all signals in said band, said adjustable tuning means comprising an oscillator and means for continuously and repetitively shifting the frequency of said oscillator, said means for scanning comprising means for shifting the frequency of said oscillator at said faster rate.

14. In combination, a wave signal receiving circuit, means coupled to said circuit for selecting all signals within a frequency band of predetermined width, adjustable tuning means for continuously and repetitively shifting the frequency position of said band at one rate, means for scanning said band at a faster rate and simultaneously visually reproducing all signals in said band, said adjustable tuning means comprising a first oscillator, and means for varying the frequency of said first oscillator at said one rate, said means for scanning including a second oscillator and means for varying the frequency of said second oscillator at said faster rate.

15. In combination, a wave signal receiving circuit, means coupled to said circuit for selecting all signals within a frequency band of predetermined width, said means comprising a mixer having an input circuit coupled to said radio signal receiving circuit, adjustable tuning means for continuously and repetitively shifting the frequency position of said band at one rate, said adjustable tuning means comprising an oscillator coupled to said input circuit and means for shifting the frequency of said oscillator at said one rate, means for scanning said band at a faster rate and simultaneously visually reproducing all signals in said band, said means for scanning comprising a further oscillator coupled to said input circuit and means for shifting the frequency of said oscillator at said faster rate.

16. In combination, a first scanner comprising wave translating means for cyclically scanning a predetermined frequency range within which electric waves of different frequencies may appear, said first scanner including frequency selective means limiting the wave output thereof to a wave frequency range that is narrower than said first-mentioned frequency range, a second scanner connected to receive the said wave output of said first scanner, said second scanner comprising means for cyclically scanning the said narrower frequency range, said second scanner including frequency selective means limiting the response thereof at any moment to waves within a still narrower frequency range.

17. In combination, a signal receiving circuit adapted to pass all signals within a frequency band of predetermined width, frequency converting means coupled to said circuit, said frequency converter comprising a heterodyning oscillator, means for continuously and repetitively varying the frequency of said heterodyning oscillator about the center frequency of said frequency band and over a substantial range of frequency values included in substantially one-half said frequency band, an intermediate frequency band-pass circuit having a center frequency numerically equal to approximately one quarter of the width of said band, and means including indicating means coupled to said intermediate frequency band-pass circuit and operative continuously to scan the pass band of said intermediate frequency band-pass circuit and to display the frequency content thereof.

18. In combination, a signal receiving circuit adapted to pass all signals within a frequency band of predetermined width, a frequency converter coupled to said circuit for converting the frequencies of signals passed by said circuit, said frequency converter comprising a tunable heterodyning oscillator tunable about a center frequency falling substantially at the center of said frequency band, whereby said converter may provide converted upper and lower image signals, simultaneously, means for continuously and repetitively scanning the frequency of said heterodyning oscillator over a substantial range of frequency values about said center frequency over a maximum range included in half said frequency band, an intermediate frequency band-pass circuit coupled to said converter for amplifying signals converted by said converter, said intermediate frequency band-pass circuit having a center frequency numerically equal to approximately one-quarter of the width of said band, whereby frequencies above and below the center frequency of said band are converted simultaneously to frequencies within the pass band of said intermediate frequency band-pass circuit in the course of each scanning of the frequency of said heterodyning oscillator, and indicator means coupled to said intermediate frequency band circuit for indicating the frequency content of said intermediate frequency band pass circuit.

19. The combination in accordance with claim 16 in which said last mentioned frequency selective means is at least several times more sharply selective than the first mentioned frequency selective means.

20. The combination in accordance with claim 16 in which said frequency selective means included in said second scanner has a center frequency numerically equal to substantially one-quarter of the width of said first mentioned frequency range.

MARCEL WALLACE.

REFERENCES CITED

The following references are of record in the file of this patent:

UNITED STATES PATENTS

| Number | Name | Date |
|---|---|---|
| 1,753,444 | Ohl | Apr. 8, 1930 |
| 1,853,953 | Becker | Apr. 12, 1932 |
| 1,994,232 | Schuck, Jr. | Mar. 12, 1935 |
| 2,084,760 | Beverage | June 22, 1937 |
| 2,145,483 | Jacob | Jan. 31, 1939 |
| 2,151,810 | Siemens | Mar. 28, 1939 |
| 2,162,827 | Schrader | June 20, 1939 |
| 2,166,274 | Whitelock | July 18, 1939 |
| 2,159,790 | Freystedt et al. | May 23, 1939 |
| 2,228,815 | Deerhake | Jan. 14, 1941 |
| 2,273,914 | Wallace | Feb. 24, 1942 |
| 2,279,151 | Wallace | Apr. 7, 1942 |
| 2,287,925 | White | June 30, 1942 |
| 2,312,203 | Wallace | Feb. 23, 1943 |
| 2,363,583 | Gilman | Nov. 28, 1944 |
| 2,367,907 | Wallace | Jan. 23, 1945 |
| 2,387,685 | Sanders | Oct. 23, 1945 |
| 2,400,133 | Pray | May 14, 1946 |

FOREIGN PATENTS

| Number | Country | Date |
|---|---|---|
| 368,286 | Great Britain | Mar. 2, 1932 |
| 834,082 | France | Nov. 10, 1938 |

OTHER REFERENCES

"Electronic Sweep Oscillator, etc.." An RCA Operating Manual, published 1937; RCA Mfg. Co., Camden, N. J.